United States Patent [19]

Boschi

[11] Patent Number: 4,557,747
[45] Date of Patent: Dec. 10, 1985

[54] MULTIPLE-DROP FEEDING SYSTEM OF MOLTEN GLASS AND OF OTHER MATERIALS

[75] Inventor: Alide Boschi, Monterrey, Mexico

[73] Assignee: Vitro Tec Fideicomiso, Monterrey, Mexico

[21] Appl. No.: 561,533

[22] Filed: Dec. 14, 1983

[30] Foreign Application Priority Data

Dec. 15, 1982 [MX] Mexico ............................ 195648

[51] Int. Cl.[4] .............................................. C03B 7/08
[52] U.S. Cl. ........................................ 65/328; 65/330; 65/331
[58] Field of Search ................... 65/325, 328, 330, 331

[56] References Cited

U.S. PATENT DOCUMENTS

| | | | |
|---|---|---|---|
| 1,626,737 | 5/1927 | LaFrance | 65/328 |
| 1,926,764 | 9/1933 | Dorman | 65/328 |
| 2,707,354 | 5/1955 | Peiler | 65/330 |
| 3,582,309 | 6/1971 | Bracken | 65/328 |
| 3,711,266 | 1/1973 | Daly | 65/328 |

*Primary Examiner*—Arthur Kellogg
*Attorney, Agent, or Firm*—Abelman Frayne Rezac & Schwab

[57] ABSTRACT

A multiple gob glass feeder system has a conventional feeder bowl with an outlet spout in which a triple or quadruple orifice plate is provided to deliver a plurality of uniform, molten glass gobs. The feeder has two plungers mounted pivotally in the support base, which are angularly and symmetrically adjusted, by a mechanism of angular adjustment, coupled between said plungers, in order to graduate the position of said plungers, according to three or four discharge orifices in the orifice plate.

5 Claims, 6 Drawing Figures

MULTIPLE-DROP FEEDING SYSTEM OF MOLTEN GLASS AND OF OTHER MATERIALS

This invention is related to a multiple-drop feeding system of molten glass and of other materials, and particularly, to a mechanism aimed to graduating, angularly and symmetrically, as to the axis of the system, the proper position of two plugs, in respect to the feeding orifices (holes) of a molten glass feeder.

The drop-feeding system of molten glass and of other materials includes: a molten glass feeder; an orifice-plate fixed at the bottom of said feeder, so as to allow continuous flow of glass; a hollow tube coupled in the interior of such feeder and aligned directly with the orifice-plate, same which rotates continuously, in order to uniformize the temperature and composition of glass, and two plugs placed in the hollow area of the tube for the continuous flow of glass through the above mentioned feeding orifices, by means of alternating movements; the improvement includes: a mechanism of angular adjustment fixed to said plugs, in order to pivotally vary and adjust the distance between centers of such plugs, changing the position of these with respect, at least, to three feeding orifices; thus attaining control of the glass flow and, thereby, identical form and weight in and of drops.

BACKGROUND OF THE INVENTION

For the manufacture of glass articles, it is necessary to feed, through a series of orifices in a feeder, a continuous flow of molten glass, same which is shear afterwards, by a proper cut mechanism, into portions named drops, according to the required weight and size.

Nevertheless, the weight and size of the gobs are variable, for they depend upon the temperature of the glass infeeder, the height of the rotary tube, the cutting rhythm, and last but not least the diameter of the orifices themselves.

In view of the necessity of manufacturing smaller articles, certain improvements in the feeder were developed, same which introduced plates of three or four discharge orifices. As the number of orifices increased, the need for plungers in the interior of the tube grew too (one plunger per orifice), causing, there fore, problems of space within it, since the cited plungers must be all placed in the interior of such tube, but also keeping some distance between each.

Moreover, due to the space limitation within the tube, the inclusion of more than two plungers therein forces the same to be thinner than the ordinary ones, and, so, more liable to be broken by the normal vibrations of the feeding system, particularly when the speed is high. As the result of the breakage of any one of such plugs, the production would have to be stopped for exchanging the corresponding plunger or plungers.

Another problem found in the feeders, is that consisting of the adjustment of the plungers once the production is started, since, as it had been previously explained, there are some variations in glass that affect the size and weight of the gobs.

At present, there are several systems based on the feeding through three orifices, but the same have to be adjusted before the production is started. The U.S. Pat. No. 3,582,309 to R. S. Bracker discloses a triple gob glass feeder with adjustable plungers, featuring the respective discharge orifice-plate, so as to facilitate the discharge of three different flows of glass, which are cut afterwards into gobs of the size required. In this case, the central plunger is vertically adjustable, and the lateral ones are adjustable both, horizontally and vertically.

The U.S. Pat. No. 3,711,266, discloses a supporting mechanism which holds a plurality of plungers in one feeder in an individual manner, this is to say, in a way which permits the individual adjustment of each, thus allowing the plunger to keep aligned in respect of the discharge orifice-plate. In this case, the supporting mechanism lets each plunger be independently adjusted, both, vertically and horizontally.

The problem found in these systems consists in that, once the plungers are adjusted and placed in the feeder, they are not easily adjustable when the conditions of the system (the adjustment of the glass flow and/or of the weight of the gobs) vary. This circumstance, in turn, would force a stoppage of production to carry out the necessary corrections, situation from which a loss of production may derive. But if uniformizing the weight and shape of the gobs in a triple gob glass-feeder is hard, it is difficult in a four-gob glass feeder, just as the one featured and claimed in the U.S. Pat. No. 4,305,747 of Kirkman et al, which uses only one plunger for the simultaneous feeding of a number of orifices ranging from three to six. Said plunger is placed in the interior of a cylindrical tube which controls the supply of molten glass. The improvement in this system consists of a tubular structure coupled to the bottom of the feeder, as well as of an orifice-plate (fastened to that tubular structure) which may comprise from three to six orifices. The said structure is relatively tall, showing a circular shape in its upper part and an elongated slot passageway in the bottom thereof, where the orifice-plate is fastened to.

In systems of this kind and due to the variation of the temperature of glass or to the loss of heat of same, the problem is that the flow of glass in the external orifices tends to be slower than in the central ones, therefore resulting in the formation of lighter and cooler gobs coming out through the external orifices.

Another disadvantage of the gob-feeders known to date is that, as the number of plungers in the tube is increased, there is less homogenization and loss of heat of the molten glass within the tube, just as it happens with the systems featured by the Bracker and Daly patents.

The same problems occur in the system of the Kirkman Patent, for, with only one plunger and a special fixture in the bottom of the feeder, is intended to feed from three to six glass gobs bearing the same form and weight. However it is well known that with only one plunger, a maximum of two orifices can be controlled.

A further disadvantage of this system is that, due to the thickness of the plunger, a variable condition of glass prevails, since the space between the tube and the plunger is reduced, thus affecting the viscosity and temperature of glass.

Hence, aware of these problems, the author of this invention devised a system for the angular graduation of the position of two plungers, according to the position required in respect of the orifices of a glass feeder; in order to provide a uniform flow through each of them. Said system may be graduated even when the feeding system is at work, thus avoiding the stoppages of production.

Besides, this system which features the least possible number of plungers (two), may feed up to four orifices; offering the advantage that, when there might be any variations of weight between the internal and the external orifices—in a four-orifice system—or between the external and central orifices—in a triple-orifice system—the same may be angularly and symmetrically adjusted, until a achieving an identical form in the gobs. Furthermore, there is no need to change this system when a triple-individual sectional glass forming machine is substituted for a quadruple one or vice versa.

Thus, by means of these systems, the ideal centering of the plungers is attained through an angular variation of same, so allowing to perform any operation of adjustment of weight and shape of the gobs with the system at work; putting aside in this manner, the stoppages of production.

One more characteristic of this system is that, in using fewer plungers, it will permit that they be bigger, stronger and less liable to be broken; and, also, this system of variable centers could be adapted for the process of feeding through two, three or four orifices.

SUMMARY OF THE INVENTION

Considering the defects of the prior techniques, is an object of this invention to provide a multiple-gob feeder system of molten glass and of other materials, by means of an angularly-adjustable system of plungers, of great flexibility, which, after a proper adjustment and through its corresponding discharge orifice-plate, may be adapted for the supply of two, three or four molten glass gobs, in accordance with the weight and size required.

Another purpose of this invention is to provide a multiple-gob feeding system of molten glass and of other materials, whereby the angularly-adjustable plunger-system adjusts the plungers symmetrically.

A third object of this invention is to provide a multiple-gob feeding system of molten glass and of other materials, whereby the plunger-system allows the adjustment of the gobs weight in a simple manner, without causing stoppages of production.

An additional object of this invention is to provide a mutliple-gob feeding system of molten glass and of other materials, which allows to have greater homogeneity in the viscosity of glass, even when feeding it through four orifices.

These and other objects and advantages shall be evident to the experts in the field, from the full description of this invention that follows.

BRIEF DESCRIPTION OF THE DRAWINGS

The invention will be hereafter described, by referring to a specific modality of same, which is shown in the accompanying drawings as an illustration thereof, and where the numbers are related to the same parts of the figures included, consisting.

FULL DESCRIPTION

Referring specifically to the drawings, where the similar components are designated by reference numbers which are the same on all of the figures, represents an angularly-adjustable plunger-system for a gob feeder of molten glass, showing in accordance with a referred modality (but not limited to it) of this invention.

Figure 1:
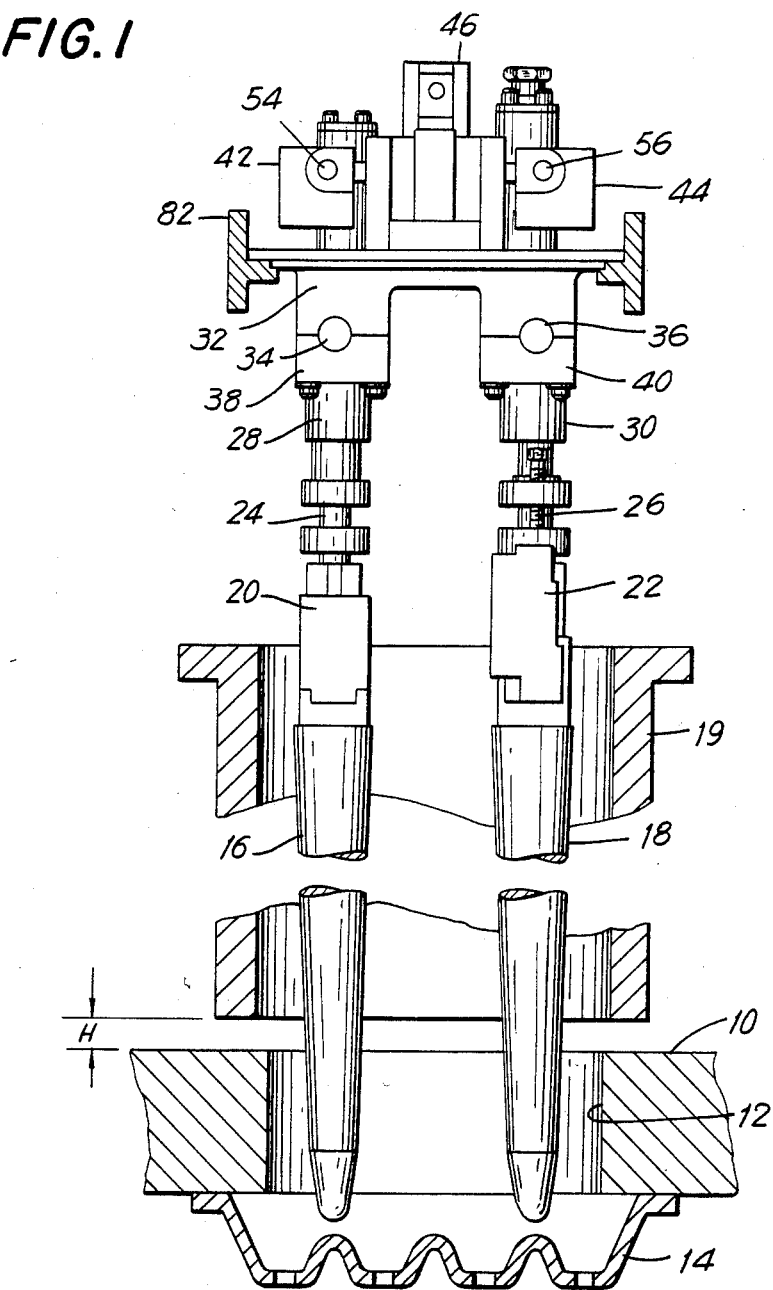
FIG. 1, of an elevation-view, showing the plunger-system in a feeder of molten glass, according to this invention.
Figure 1A:
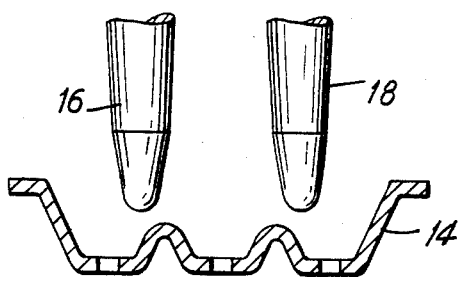
FIG. 1A, of an illustration of the system of the invention, the same being used in three feeding orifices.

FIG. 1, shows a sectional-view of a molten glass feeder, including: a glass feeder bowl (not show) which has a lower wall 10, area in which a outlet spout 12 may be recognized; an orifice-plate 14, adjacent to said spout 12, through which flows a discharge of molten glass; a revolving tube 19, perpendicularly aligned in respect of the spout 12, and which keeps a space H between the lowest part of said tube 20 and the lower wall 10, thus permitting the flow of a determined amount of molten glass, in order to be fed from the glass feeder bowl (not show) to the area of the outlet spout 12, and from there to an orifice-plate 14, and a pair of plungers 16, 18 to regulate or control the flow of glass glass by conventional reciprocating action of said plungers 16, 18.

As has been noted hereinbefore, each of the plungers 16,18, are properly fastened by adjusting clamps 20,22 from their respective top portion, in order to trap and hold such plungers 16,18. A fixed shaft 24,26 is coupled with each adjusting clamp of each of the plungers 16,18, so as to be adjustably fastened to a pair of guides 28,30 and to a plunger-support base 32.

Figure 5:
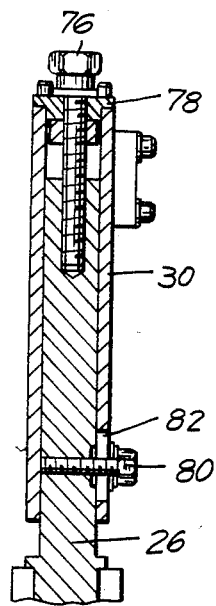

Each of the guides 28,30, has transversally-fixed bolts 34,36 which are properly fastened to the lower portion of said support-base 32 by clamps 38,40, so as shown in FIG. 1 and FIG. 5. Then said plungers 16, 18 are pivoted in said guides 28, 30 and the upper ends are connected to mechanism of the present invention.

In accordance with one preferred embodiment of the angularly adjustable mechanism which includes: a pair of supporters 42, 44, positioned separately in the upper part of the support base 32, which serves to fasten the upper end of the guides 28, 30 of said plungers 16, 18; and a mechanism 46, coupled between the supporters 42, 44 which serves to graduate angularly and simetrically the position vertical of said plungers 16, 18 in a manner to be described.

Figure 3:
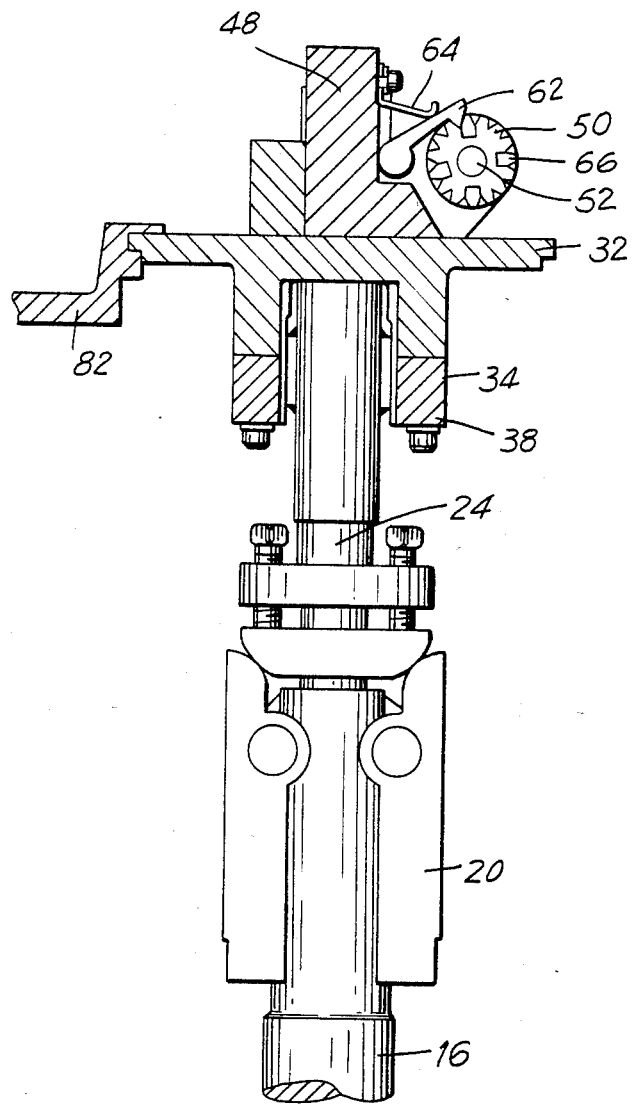
FIG. 3, is a sectional view, showing the system of this invention sidewise.

Said mechanism 46, is provided with: a supporter 48 (FIG. 3) fastened to the support-base 32; a gear 50 provided with a shaft 52, is positioned in the middle part of supporter 48; the ends of the said shaft 52 cross the walls of said supporter 48, so as to be respectively coupled to both supporters 42,44. This coupling is carried out by means of the shaft 52 and the supporting-bolts 54,56, pivotally fixed to the walls of the supporters 42,44; a pair of graduated rings 58,60 at both sides of the gear 50, firmly fastened to this, in order to rotate with it, thus indicating—by a determined radius of gyration—the extent of opening or closing which should be given to the plungers 16,18; a pawl 62, that by means of a spring 64 applies force on the teeth of the gear 50, avoiding the gear from moving and thereby changing the position of the plungers 16,18.

In accordance with the invention, every time that the weight and shape of the glass gobs have to be adjusted, it shall only be necessary to rotate the gear 50 in the desired position, through of orifices 66 made on the surface of said gear 50, adapted to receive, a rod (not shown), to gyrate in one direction the gear 50, to open angularly the plungers 16,18 and, when it gyrates in the opposite direction, it tends to close them angularly, best shown in FIG. 1. This movement will be possible having account that the plungers 16,18 are pivoted angularly in the support-base 32 by means of the guides 28,30 of the plungers 16,18.

Figure 2:
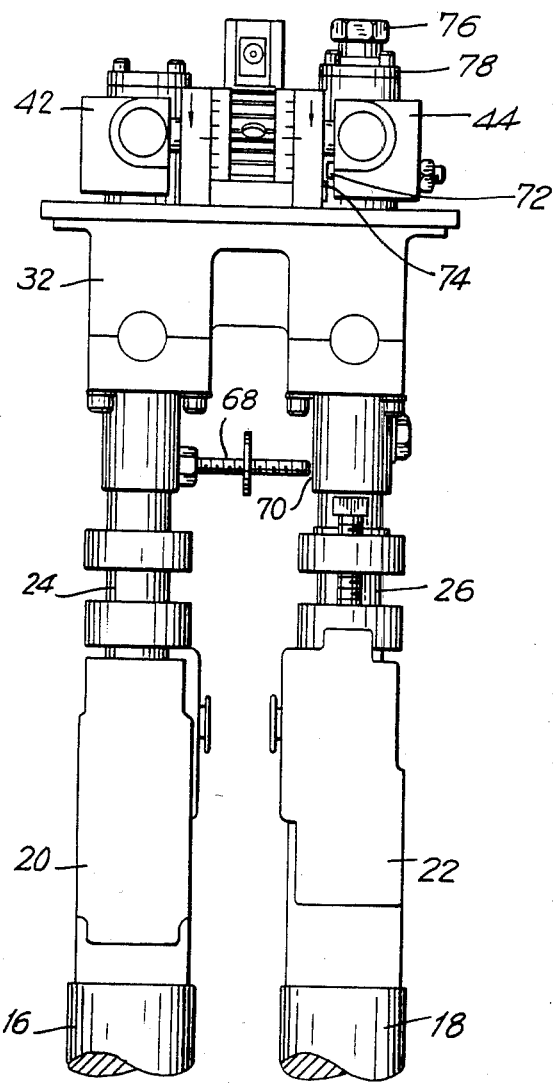
FIG. 2, is a side elevation showing the plunger-system of this invention.
Figure 4:
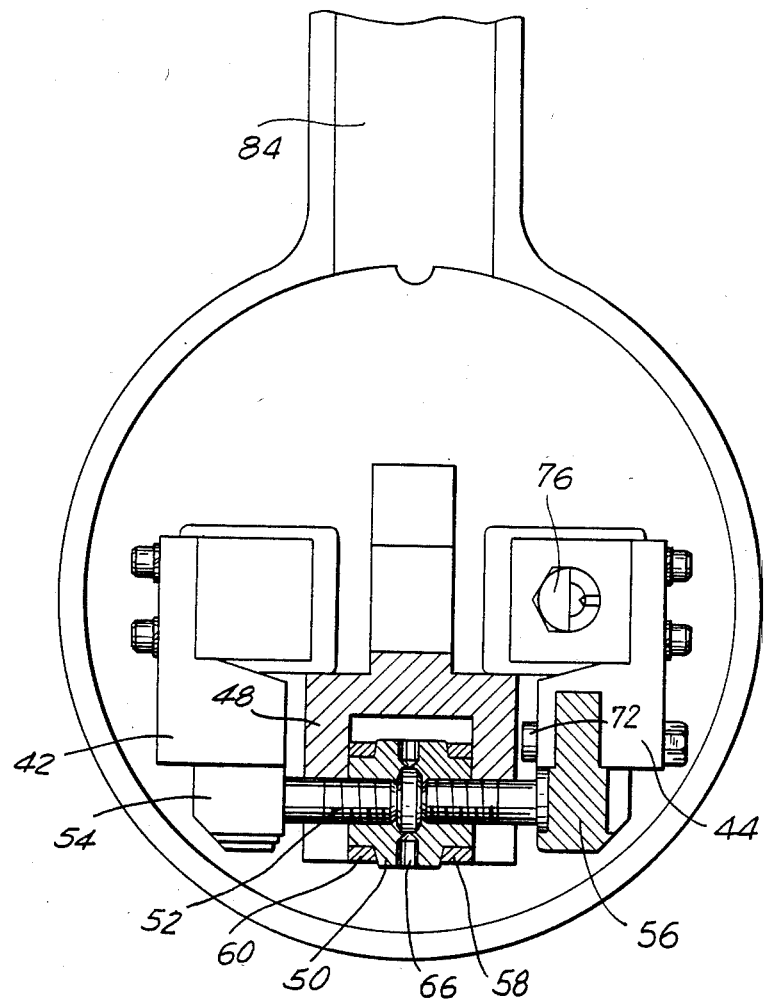
FIG. 4, of a plan view, showing the top-part of this invention's system referred to in FIG. 1, and FIG. 5, of a detailed view taken from FIG. 2, showing the vertical adjustment of one of the plungers.

This invention includes, also, a safety system (FIG. 2) which avoids that the plungers 16,18 may break when they are opened or closed too much. Said system features: a stop 68, fastened from one of its ends to the shaft 24 of the plunger 16, and maintaining a previously established space 70, indicating the distance which may be reached by the plungers 16,18 when closing. Another stop 72 (FIGS. 3 and 4) crosses the supporter 44, maintaining a space 74 between the first stop 72 and one of the walls of the supporter 44, in order to avoid that the plungers 16,18 be opened beyond their proper points.

Referring specifically to FIG. 5, it show a sectional view of the plunger 18, which is vertically-adjustable in respect of plunger 16, which is fixed, so that, when they are assembled to the mechanism, the plunger 18 be adjusted at the same height as the other plunger's. This adjustment is effected owing to the fact that the shaft 26 has, on its upper portion, a thread in which a screw 76 is introduced; a cap 78 placed on the upper portion of the supporter 44, serves as a holding-base for the screw 76, so as to drive the plunger up or down to the desired height, and a screw 80 which, through a lateral groove 82 in the guide 30, permits the plunger 18 a certain vertical sliding when being adjusted. Once the height of the plunger 18 has been adjusted, the screw 80 is firmly tightened, in a way which may leave the plunger-system completely fixed at the required height.

It should be noted that, this system in whole, once the conditions of operation are implemented, shall be positioned on a conventional supporter 82 of a arm (not shown), in a way that may permit the plungers 16,18, by means of their respective mechanism, to have an vertical reciprocatory movement, so as to supply continuous flows of molten glass—through the corresponding orifice-plate—which will be cut into gobs, and these, in turn, shall be fed to the forming machine.

Even when this invention has been described for a specific modality, it shall have to be understood that said invention must not be limited thereto, for such angularly-adjustable mechanism could be coupled only to one plunger and to a double-orifice plate, with the same advantages heretofore expressed; thus being evident to the specialists of the field that other positions of the angularly-adjustable plunger-system, as well as additional functions thereof, could be implented, same which should be clearly contained within the scope and the intendment of this invention, hereafter claimed, pursuant to the following claims.

I claim:

1. In a multiple gob glass feeder system having a conventional feeder bowl with a lower outlet spout over which the molten glass is adapted to flow in response to vertical reciprocating motion of two plungers and a revolving tube arranged coaxially with said plungers in order to uniformize the temperature and composition of the molten glass, the improvement comprising:
    a. support means for said plungers, including pivotal means for each plunger,
    b. supporters positioned at the support means, which serves to fasten the upper end of each plungers, and
    c. an angularly adjustable mechanism, coupled between said supporters, which serves to graduate angularly and symmetrically the vertical position of said plungers.

2. The improvement of the claim 1, further characterized by support bolts coupled to said supporters to interconnect the angularly adjustable mechanism.

3. The improvement in accordance with claim 1, wherein said angularly adjustable mechanism to graduate angularly and symmetrically said plungers comprises:
    a. a supporter coupled to the support means,
    b. gear means including a shaft, which is positioned in the middle part of said supporter,
    c. graduate means coupled at both sides of the gear means to indicate the radius of gyration of said mechanism to graduate the opening or closing of said plungers, and
    c. pawl means connected to said supporter to fix the position of said plungers according to three or more discharge orifices.

4. The improvement of the claim 1, further characterized in that said angularly adjustable mechanism comprises:
    a. stop means to limit the extent of the opening or closing of said plungers.

5. The improvement of the claim 3, further characterized in that when the gear means are rotated in one direction, the plungers open angularly and when it rotates in the opposite direction, said plungers tend to close angularly.

* * * * *